(12) United States Patent
Shaw et al.

(10) Patent No.: US 9,866,675 B2
(45) Date of Patent: Jan. 9, 2018

(54) DYNAMICALLY ORGANIZING VISUAL VOICEMAIL

(75) Inventors: Venson M. Shaw, Kirkland, WA (US); Robert Z. Evora, Douglasville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1548 days.

(21) Appl. No.: 12/607,150

(22) Filed: Oct. 28, 2009

(65) Prior Publication Data

US 2011/0098021 A1    Apr. 28, 2011

(51) Int. Cl.
| | |
|---|---|
| H04W 12/06 | (2009.01) |
| H04W 8/20 | (2009.01) |
| H04L 29/06 | (2006.01) |
| H04M 1/725 | (2006.01) |
| H04M 3/533 | (2006.01) |

(52) U.S. Cl.
CPC ...... H04M 1/72572 (2013.01); H04M 1/7255 (2013.01); H04M 3/53333 (2013.01); H04M 2201/38 (2013.01); H04M 2203/253 (2013.01); H04M 2207/18 (2013.01)

(58) Field of Classification Search
CPC ... H04L 12/5815; H04L 51/043; H04L 67/18; H04M 3/43042; H04M 3/533; H04M 1/274583; H04M 1/72572; H04M 1/7255; H04M 3/53333; H04M 2207/18; H04M 2201/38; H04M 2203/253; H04M 1/72563; H04M 1/72547; H04W 4/02

USPC ... 455/413, 412.2, 563, 456.1, 456.2, 456.3, 455/456.5, 456.6, 412.1; 379/88.01, 379/88.11, 88.12, 88.14

See application file for complete search history.

(56) References Cited

U.S. PATENT DOCUMENTS

| | | | |
|---|---|---|---|
| 7,237,009 B1 * | 6/2007 | Fung et al. | 709/206 |
| 7,336,963 B1 * | 2/2008 | Rayburn et al. | 455/456.3 |
| 7,899,468 B2 * | 3/2011 | Lohtia et al. | 455/456.1 |
| 8,233,943 B1 * | 7/2012 | Othmer | G06F 9/542 379/207.16 |
| 2003/0128820 A1 * | 7/2003 | Hirschberg et al. | 379/88.14 |
| 2007/0078965 A1 * | 4/2007 | Shimamura | H04L 12/5815 709/224 |
| 2008/0062940 A1 * | 3/2008 | Othmer | H04W 4/02 370/338 |
| 2008/0075244 A1 * | 3/2008 | Hale | H04M 3/42221 379/88.13 |
| 2008/0126951 A1 * | 5/2008 | Sood et al. | 715/752 |
| 2009/0012878 A1 * | 1/2009 | Tedesco | G06Q 30/06 705/26.41 |

(Continued)

Primary Examiner — George Eng
Assistant Examiner — Hung Du
(74) Attorney, Agent, or Firm — Baker & Hostetler LLP

(57) ABSTRACT

Visual voicemail is dynamically organized according to detected criteria. Voicemail may be automatically associated with a category, priority, or other attribute. The attributes may be assigned based on user-configured associations with particular senders, the detection of user-defined words or phrases within the voicemail, or on other attributes such as the voicemail sender's relative location to the voicemail recipient. Voicemail may be visually identified as being associated with one or more attributes, and may be organized and presented to a user based on the associated attributes. Actions may be performed and the voicemail may be manipulated based on the attributes.

9 Claims, 12 Drawing Sheets

(56) References Cited

U.S. PATENT DOCUMENTS

| | | | |
|---|---|---|---|
| 2009/0271486 A1* | 10/2009 | Ligh | G06F 3/04886 709/206 |
| 2009/0292528 A1* | 11/2009 | Kameyama | B60Q 3/0293 704/9 |
| 2010/0004005 A1* | 1/2010 | Pereira et al. | 455/457 |
| 2010/0080365 A1* | 4/2010 | Seetharaman | H04M 1/7255 379/88.22 |
| 2010/0087173 A1* | 4/2010 | Lin | H04L 51/16 455/412.2 |
| 2010/0130173 A1* | 5/2010 | Gupta | H04M 3/42042 455/412.1 |
| 2010/0150322 A1* | 6/2010 | Yin | H04M 3/533 379/88.14 |
| 2010/0330972 A1* | 12/2010 | Angiolillo | H04M 1/274583 455/418 |

* cited by examiner

Visual Voicemail — 300, 310, 320, 330, 340, 350, 360

All | Location | Priority | Favorites | Saved

Susie: 10/10/09 – 11:35 PM
404-555-5522
*0.2 miles from current location*

Joe: 10/11/09 – 9:15 AM
404-555-1234
*1.3 miles from current location*

Fave Store: 10/13/09 – 6:55 AM
800-555-8828
*2.5 miles from current location*

Mom: 10/12/09 – 9:13 PM
404-555-2468
*52.6 miles from current location*

Boss: 10/11/09 – 11:54 AM
404-555-8888
*Location unknown*

*Figure 3*

Visual Voicemail — 200, 210, 220, 230, 240, 250, 260

All | Location | Priority | Favorites | Saved

Fave Store: 10/13/09 – 6:55 AM
800-555-8828

Mom: 10/12/09 – 9:13 PM
404-555-2468

Boss: 10/11/09 – 11:54 AM
404-555-8888

Joe: 10/11/09 – 9:15 AM
404-555-1234

Susie: 10/10/09 – 11:35 PM
404-555-5522

*Figure 2*

Visual Voicemail — 700

Voicemail details

Jimmy Smith: 10/11/09 — 11:54 AM
404-555-8888

Assign priority — 720
☐ High
☑ Medium
☐ Normal (default)
☐ Low

Assign category — 730
☐ Favorites
☑ Auto-save

[New category] — 735

Keywords [Sapphire project] — 740

☐ Apply priority/category to all voicemails from sender — 750
☑ Apply priority/category only to voicemails containing keywords — 760

[Save]   [Cancel]

Visual Voicemail — 600

| All | Location | Priority | Favorites | Saved | — 610

Boss: 10/11/09 — 11:54 AM
404-555-8888
HIGH PRIORITY   ✓!! — 620

Fave Store: 10/13/09 — 6:55 AM
800-555-8828
Low priority   ✓ — 630

Visual Voicemail Options — 961

Sender specified category: Personal — 963

Assign priority — 962
- ☐ High
- ☐ Medium
- ☒ Normal (default)
- ☐ Low

Assign category — 964a
- ☒ Favorites
- ☐ Auto-save
- [New category] — 965

Sender specified category: Sales — 967

Assign priority — 966
- ☐ High
- ☐ Medium
- ☐ Normal (default)
- ☒ Low

Assign category — 964b
- ☐ Favorites
- ☒ Auto-save
- [New category]

[Save]   [Cancel] — 968

Figure 8

Visual Voicemail Options — 810

Keywords: [Sapphire project]
When keywords detected: — 830

Assign priority — 820
- ☒ High
- ☐ Medium
- ☐ Normal (default)
- ☐ Low

Assign category — 835a
- ☐ Favorites
- ☒ Auto-save
- [New category] — 840

Distance from current location [2.5] mi.
When sender is within distance: — 860

Assign priority — 850
- ☐ High
- ☒ Medium
- ☐ Normal (default)
- ☐ Low

Assign category — 835b
- ☐ Favorites
- ☒ Auto-save
- [New category]

[Save]   [Cancel] — 870

800

DYNAMICALLY ORGANIZING VISUAL VOICEMAIL

TECHNICAL FIELD

The technical field generally relates to wireless communications and more specifically relates to dynamically organizing visual voicemail leveraging communications devices.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities, the ability to communicate with data networks such as the internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. A user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server. In some implementations, voicemail can be converted to text using speech recognition technology and then read through the visual voicemail interface or transmitted, for example as an email. However, the state of the technology does not allow a user to categorize or organize voicemail in a customized fashion to meet specific user needs, preferences, and/or requirements.

SUMMARY

Visual voicemail can be dynamically organized according to various attributes. Voicemail may have attributes associated with the content, and these attributes may be used to determine how to present indicators of the voicemail to a user. Attributes may include categories, priorities, locations, presence of keywords, etc. When presented to a user, the entries representing voicemail may include the voicemail's associated attributes. The voicemail may also be sorted or filtered according to the attributes and the particular view being presented by a visual voicemail system to a user.

A user may define how attributes are assigned to voicemail in various ways. In one embodiment, a user may configure a device to associate a certain category or priority to every voicemail from a particular recipient. In other embodiments, a user may configure a device to detect certain keyword in a voicemail, and upon detection of the keywords, assign a certain priority or category to such voicemail. Alternatively, voicemail may be automatically sorted or presented based on other criteria not set by a user. For example, voicemail may be sorted or filtered based on the physical distance from the voicemail sender to the location of the intended recipient. This may be performed by determining the distance from GPS or other location data. Other embodiments and further details are set forth herein.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 2 illustrates a non-limiting, exemplary representation of a user interface that may be used in connection with dynamically organizing visual voicemail.

FIG. 3 illustrates a non-limiting, exemplary representation of a user interface that may be used in connection with dynamically organizing visual voicemail.

FIG. 6 illustrates a non-limiting, exemplary representation of a user interface that may be used in connection with dynamically organizing visual voicemail.

FIG. 7 illustrates a non-limiting, exemplary representation of a user interface that may be used in connection with dynamically organizing visual voicemail.

FIG. 8 illustrates a non-limiting, exemplary representation of a user interface that may be used in connection with dynamically organizing visual voicemail.

FIG. 9 illustrates a non-limiting, exemplary representation of a user interface that may be used in connection with dynamically organizing visual voicemail.

DETAILED DESCRIPTION OF ILLUSTRATIVE EMBODIMENTS

Figure 1:
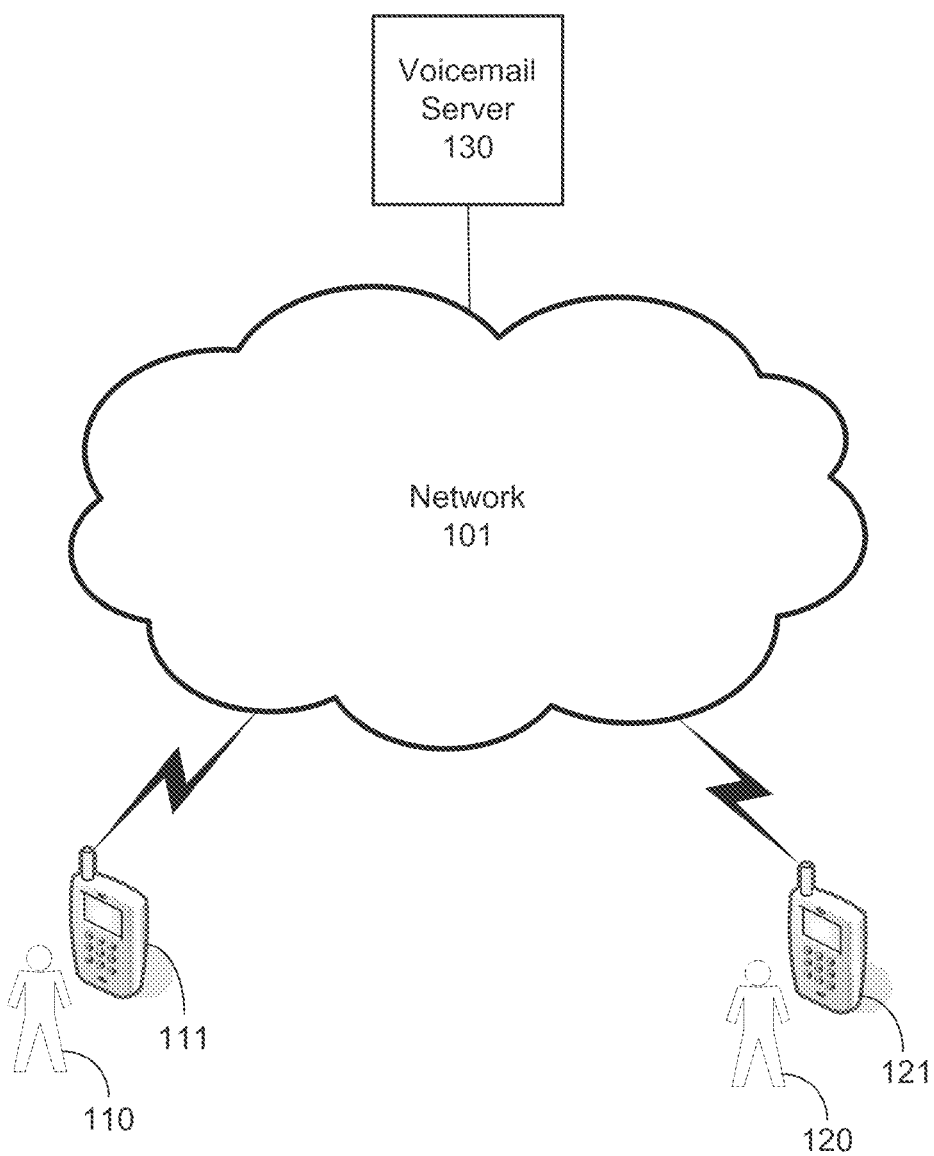
FIG. 1 is a block diagram of a non-limiting, exemplary network environment in which visual voicemail data may be dynamically organized.

FIG. 1 illustrates a network environment in which one or more embodiments of dynamically organizing visual voicemail may be implemented. User 110 may operate wireless device 111, and user 120 may operate wireless device 121. Each of wireless devices 111 and 121 may be any type of wireless mobile communications device, including a mobile telephone, smart phone, personal data assistant (PDA), mobile computer, wireless email device, or any combination thereof. Alternatively, while wireless devices 111 and 121 as illustrated represent wireless mobile communications devices, wireless devices 111 and 121 may also represent a wired device, such as a landline telephone, computer, email device, or any other communications device or any combination thereof. All such embodiments are contemplated as within the scope of the present disclosure.

Wireless devices 111 and 121 may communicate with network 101. Network 101 may be any type of network capable of providing wireless services to wireless devices of any type. Network 101 represents any number of interconnected networks that may be composed of any number and type of wired and/or wireless network devices. Network 101 may enable wireless devices 111 and 121 to communicate with each and with other mobile devices. Additionally, network 101 may enable wireless devices 111 and 121 to communicate with computing devices such as voicemail server 130 and other servers accessible via network 101 such as web servers. Such communication may be voice, data, or a combination thereof. All such embodiments are contemplated as within the scope of the present disclosure.

User 110 may wish to call user 120 by operating wireless device 111. Upon dialing the phone number associated with wireless device 121, user 110 may be connected to a voicemail system that allows user 110 to create a voicemail for user 120. This may be because user 120 fails to answer the call placed by user 110, or because wireless device 121 is unavailable for some reason, such as being located in an area with no wireless network coverage, or being shut off. Alternatively, user 110 may wish to send a voicemail to user 120 without directly calling wireless device 121, and may interact with a voicemail system to create and send the voicemail to user 120. In such a situation, user 110 may be initiating a voicemail unprompted, or may be responding to a voicemail created by user 120. In one embodiment, such a voicemail system may be operated by voicemail server 130, which may be associated with a network that provides wireless communications services to either or both user 110 and user 120. Alternatively, voicemail server 130 may be owned, operated, or maintained by a third party, and may be a component of a third party system that provides voicemail services to the operator of network 101 or any other network operator. Voicemail server 130 may be any one or more computing devices and/or software capable of performing voicemail functions as described herein. Voicemail server 130 may be dedicated to performing voicemail functions, or may be a component of a device or system that performs other functions in addition to voicemail functions.

Upon connecting to voicemail server 130, user 110 may be provided with aural prompts that allows user 110 to interact with voicemail server 130. Voicemail server 130 may solicit and store an audible voice message portion of a voicemail from user 110 using traditional telephony means. Voicemail server 130 may also prompt user 110 to attach or associate multimedia content with the voicemail, and may obtain and associate such content with the voicemail. In one embodiment, voicemail server 130 may offer user 110 the option to select a category to be associated with the voicemail. For example, voicemail server 130 may allow user 110 to specify that the voicemail is in one or more of Sales, Marketing, Personnel, or Miscellaneous categories. Other categories may be used and are contemplated.

Voicemail server 130 may also acquire or obtain through various means other information, either automatically or by prompting user 110 for such information, that may be associated with or assist in generating content for the voicemail. For example, voicemail server 130 may obtain a location of the device being used by user 110 to interact with voicemail server 130, in this example wireless device 111. Location data may be processed or modified as necessary, and may be stored with the voicemail for use in the recipient's (user 120) visual voicemail interface, as explained in further detail herein.

Voicemail server 130 may also correlate wireless device's 111 phone number with a name or other identifier using a database such as an address book associated with user 120. Voicemail server 130 may also scan the audible voice portion of the voicemail for specific words using various techniques, including recognizing words in the voice portion directly or converting the voice portion into text and scanning the resulting text. Certain words may have been selected by user 120 to be associated with certain categories, tags, identifiers, etc. Upon detection of such words, voicemail server 130 may associate a category identifier, tag, etc. with the voicemail. These tags, identifiers, etc. may be used by voicemail server 130 in generating the visual voicemail interface to be presented to user 120. Note that any or all of the above-listed actions performed by voicemail server 130 may instead, or also, be performed by the recipient's wireless device, such as wireless device 121. Once all information needed has been gathered by voicemail server 130 and the interaction with user 110 is complete, voicemail server 130 and/or related components or systems may generate and transmit a notification and/or other data that a new voicemail is available.

Such a notification may be received on wireless device 121 and may be presented to user 120. Wireless device 121 may be configured with visual voicemail software that presents a visual voicemail interface on a display of wireless device 121. Such software may be configured to interact with voicemail server 130 and/or related systems or components. Such software may function merely as a front end, with all processing of voicemail and related data performed by voicemail server 130 and/or related systems or components. Alternatively, such software may perform some or all of the processing required to present the visual voicemail interface. In another alternative, no specialized visual voicemail software may be configured on wireless device 121, and all necessary voicemail presentation data may be transmitted to wireless device 121 by voicemail server 130 and/or related systems or components. In such a system, the visual voicemail interface presented to user 120 may be web-based, and may be presented within a webpage displayed on wireless device 121 using appropriate software such as a web browser. All other alternate configurations and combinations thereof are contemplated as within the scope of the present disclosure.

More specifically, a visual voicemail interface such as that shown in FIG. 2 may be presented to user 120 on wireless device 121. Note the user interfaces illustrated in FIGS. 2-9 are exemplary only and are intended to illustrate the functionality provided by the present disclosure. These exemplary user interfaces are not intended to limit actual user interfaces that may be used in embodiments of the present subject matter. Any type, style, or form of user interface may be used with the present subject matter, and all such user interfaces are contemplated as within the scope of the present disclosure. Note also that any normal visual voicemail functions, such as viewing more details, placing a call to hear an audible voice portion of a voicemail, changing user-configurable attributes of a voicemail, deleting or saving a voicemail, or any other function may be performed directly from any of the interfaces of a visual voicemail system, and all such embodiments are contemplated as within the scope of the present disclosure.

Screen 200 in FIG. 2 illustrates an exemplary visual voicemail interface that contains several user interface elements. Tabs 210 may be presented on screen 200. Tab 210 may represent the several different views that may be available to a user of a visual voicemail interface. Tabs 210 may include user-selectable tabs that are associated with various views that may list voicemail in a particular order, or list a subset of voicemail based on various criteria. For example, on screen 200, the "All" tab is active. The "All" tab may display all available voicemail for a particular user. The voicemail shown under the "All" tab may be sorted using a default criteria, such as the time the voicemail was received. In one embodiment, as shown in screen 200, the most recently received voicemail is shown at the top of the displayed voicemail list, and the remaining voicemail is listed in descending order based on time of receipt. The tabs may be user-configurable, and may represent any category or other criteria that a user may wish to use to sort or filter voicemail. In some embodiments, entries may be dynamically sorted and/or filtered according to the various user-defined or default criteria and the view currently presented to a user.

Each voicemail information entry, such as entries 220, 230, 240, 250, and 260, may provide information about the voicemail visually so that the user can see such information rather than having to call into a voicemail server to listen to such information. Such information may include a sender's name or other identifying information, a sender's telephone number, a time and/or date of receipt of the voicemail, and icons indicating characteristics of the voicemail. Note that the sender identification data may be derived from call placed by the sender when the voicemail was composed or may be derived from a database correlation of the sender's phone number with identifying data. For example, the sender's phone number may be compared to an address book on a wireless device or maintained by a voicemail server or system in order to determine a sender's name.

In an example entry, entry 220 lists the sender as "Fave Store" and provides an associated phone number, date, and time of receipt. Also shown on entry 220 is a checkmark icon, which may represent a categorization of the voicemail. For example, a user may configure a visual voicemail interface to detect particular voicemail senders and identify those senders with an icon. Such icons and related categorizations may be used to determine a presentation order for particular entries and/or whether each entry should be displayed in a particular view, such as under a particular tab. The icon may also serve to notify the user that the entry has been categorized. In one embodiment, the checkmark icon may indicate that the voicemail is in a "auto-save" category, and is therefore automatically saved and shown under the "Saved" tab, as illustrated in FIG. 6. In one embodiment, only entries associated with voicemail categorized as "auto-save" are shown under the "Saved" tab, thus making it easy for a user to view only entries associated with voicemail in that category. Similarly, a star icon, such as that in entry 230, may indicate that a voicemail is in a "favorites" category and will be shown under the "Favorites" tab. In one embodiment, only those entries associated with voicemail categorized as "favorites" are shown under the "Favorites" tab, thus making it easy for a user to view only entries associated with voicemail in that category. In entry 250, a target icon is show which may indicate that the sender is within a certain distance of the recipient, or was within a certain distance of the recipient when the voicemail was generated. Distance data may be associated with entry 250, but may not be displayed in all views. For example, distance data may not be displayed under the "All" tab, but may be displayed under the "Location" tab, described in more detail in regard to FIG. 3. Such distance data may also be used to sort entries, for example when the entries are displayed under the "Location" tab.

Each entry may have more than one categorization and more than one icon may be associated with each entry. For example, entry 240 has a checkmark icon, which may indicate that the voicemail is automatically saved, and a double exclamation point icon, which may indicate that the voicemail is of high priority. Thus, entry 240 may be displayed under the "Saved" tab, and may be sorted according to its high priority when the entries are viewed as sorted by priority under the "Priority" tab, as described in regard to FIG. 4. Similarly, entry 260 may be shown with a target icon indicating that the sender is within a predetermined distance of the recipient, a single exclamation point icon, which may indicate that the voicemail is of medium priority, and a star icon, which may indicate that the voicemail is in a "favorites" category. Thus, entry 260 may be shown sorted according to its distance from the recipient under the "Location" tab, shown sorted according to its priority under the "Priority" tab, and shown under the "Favorites" tab with other entries associated with voicemail categorized as "favorites".

Note that other means of indicating categorizations or other characteristics of a voicemail may be used. For example, high priority voicemail entries may be highlighted in yellow while other priority entries may be highlighted in different colors. Likewise, entries in a favorites category may be highlighted in red with other entries highlighted in blue. Any other visual or audible indicator may be used to indicate that an entry is associated with a voicemail of a particular categorization, type, priority, etc., and all such embodiments are contemplated as within the scope of the present disclosure.

In one embodiment, visual voicemail entries may be sorted by the geographical distance of the sender from the recipient. In FIG. 3, tabs 310 show that the current view selected by the user is the location view, as indicated by the "Location" tab selection. FIG. 3 illustrates an example visual voicemail user interface screen 300 where the entries of FIG. 2 containing voicemail data are sorted according to distance. For example, because entry 320 has the shortest distance between the sender and the recipient, it is the first entry, and the remaining entries are presented in the order of increasing distance between the send and the recipient. Some entries may reflect that no distance was obtainable, for example entry 360. In some embodiments, such entries may be at the bottom of a distance-sorted list of entries, while in other embodiments, such entries may not be included in a distance-sorted list of entries.

In some embodiments, additional information may be shown based on the view chosen by a user. For example, in FIG. 3, additional location information is shown in each entry. Entry 320 indicates that the sender is 0.2 miles from the recipient's current location, entry 330 indicates that the sender is 1.3 miles from the recipient's current location, entry 340 indicates that the sender is 2.5 miles from the recipient's current location, and entry 350 indicates that the sender is 52.6 miles from the recipient's current location. Alternatively, the actual location of the sender may be shown, for example in ordinal or Cartesian coordinates, street address, etc. Such location data may be stored with an entry and/or a voicemail, and may be used to calculate a distance between a sender and a recipient, regardless of whether the actual location data is provided to a user. Icons may also be displayed with each entry reflecting other categorizations and priorities so that a user has easy reference to characteristics of a voicemail regardless of which view of the visual voicemail interface the user is currently observing.

A list of entries sorted by distance may be dynamically updated according as the location of the recipient and/or the sender changes. For example, as a user is viewing screen 300, the user may be traveling in a vehicle and therefore the user's current location may change. If the user's location changes such that, for example, the location associated with entry 330 is closer to the user than the location associated with entry 320, the list shown on screen 300 may be automatically modified so that entry 330 is above entry 320. Alternatively, a user's device may maintain a list sorted by distance in the background regardless of the view in use by the user, and may update the list as needed as the user's geographical position changes. In another embodiment, the user device may receive or solicit updates on the locations of senders of voicemail, and may update the location associated with each voicemail accordingly. In such an embodiment, the user device may dynamically, as needed, or on request, update a location list to reflect the last known location of voicemail senders. Any combination of these list-updating means and any other location related data may be used and presented, and all such embodiments are contemplated as within the scope of the present disclosure.

Other options may be available to a user based on location data. For example, a user may be presented with the option to request or otherwise instruct a user device or other device to generate or request a map showing a route or directions from the user's present location to the location associated with a voicemail entry. Note that this mapping option may be available to a user for any voicemail entry, not only those displayed in an order based on location. Other options based on location data are contemplated as within the scope of the present disclosure.

Figure 4:
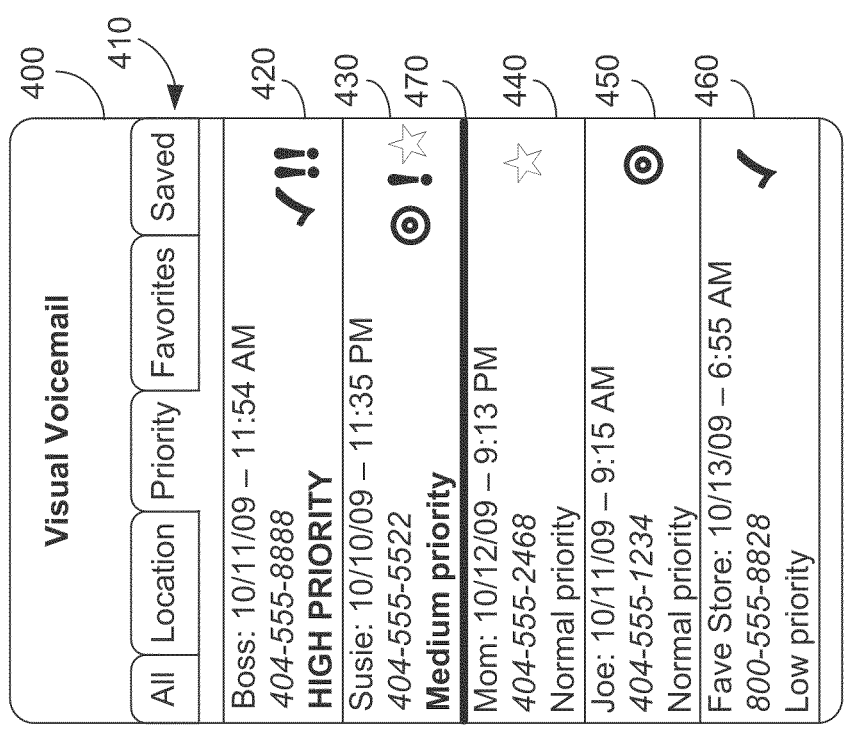
FIG. 4 illustrates a non-limiting, exemplary representation of a user interface that may be used in connection with dynamically organizing visual voicemail.

In one embodiment, entries associated with voicemail may be sorted by priority. As illustrated in FIG. 4, screen 400 may list entries based on their respective priorities under the "Priority" tab of tabs 410. Those entries associated with a voicemail that has been assigned a high priority may be listed first, followed by those with a medium priority, then those with normal priority, and then those with low priority. For example, entry 420 has high priority and therefore is shown at the top of the sorted list on screen 400. Entry 430 is next in the list because it has a medium priority and then entry 440 is shown, and so forth. For entries that are associated with voicemail that have the same priority, such entries may be sorted among themselves according to any other criteria, such as the time and date of receipt. Entries and/or the voicemail associated with them may or may not have priorities assigned. In one embodiment, if a voicemail is not explicitly in a priority category, it may be assigned a default priority, such as "normal" or "low". Alternatively, such voicemails may not be assigned a priority at all. In some embodiments, all entries may be presented in a priority view such as that shown on screen 400, while in other embodiments, only those entries associated with a voicemail that has an assigned priority or that has a priority within a specified subset of priorities may be shown.

Priority may be assigned based on any criteria or combination of criteria. For example, a user may configure a device, such as a voicemail server or a wireless device, to categorize all voicemail from a particular sender as having a certain priority. Alternatively, a user may configure a device to detect one or more words or phrases in an audible voice portion of a voicemail, or to detect any other characteristic of a voicemail, and, upon detection of the specified word, phrase, or characteristic, assign a particular priority to the voicemail. In yet another alternative, a sender may select or specify a characteristic of a voicemail, and a voicemail system or user device may detect the characteristic and automatically assign a certain priority based on detecting the characteristic. In yet another alternative, a user may configure a device to determine the distance of the sender from the user, and assign a priority based on the distance. Note that any priority scheme may be used and any labels or identifiers may be used to indicate any number of priority categories, and all such embodiments are contemplated as within the scope of the present disclosure.

In some embodiments, additional information may be shown based on the view chosen by a user. For example, the priority associated with each voicemail is shown in each entry of screen 400. An indicator, such as indicator 470 may be used to further emphasize the priority of voicemail. As illustrated on screen 400, indicator 470 is show separating entries 420 and 430, which are high and medium priority respectively, from entries 440, 450, and 460, which are each of normal or low priority. Icons may also be displayed with each entry reflecting other categorizations and priorities so that a user has easy reference to characteristics of a voicemail regardless of which view of the visual voicemail interface the user is currently observing.

Figure 5:
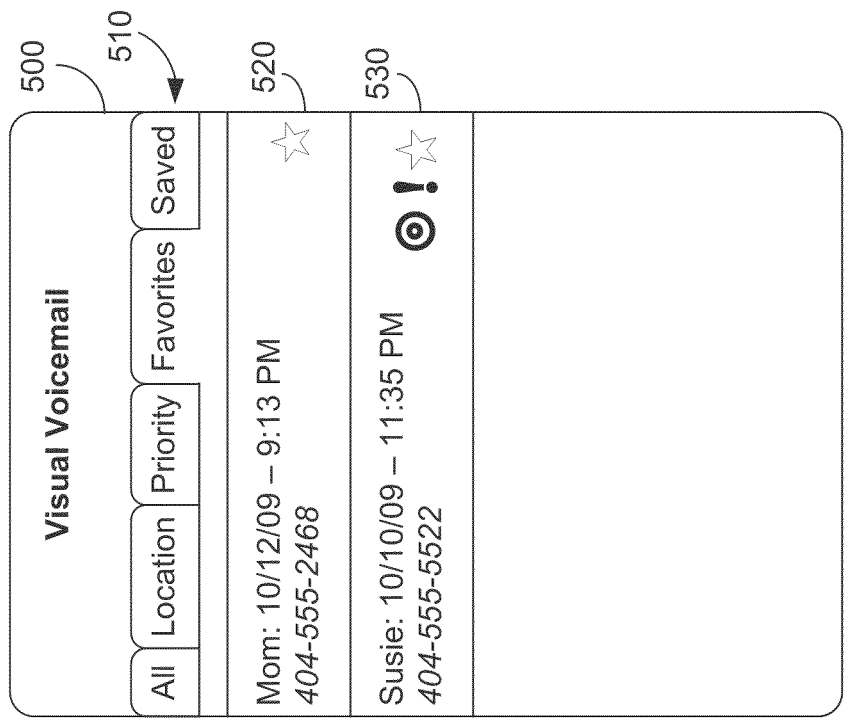
FIG. 5 illustrates a non-limiting, exemplary representation of a user interface that may be used in connection with dynamically organizing visual voicemail.

In one embodiment, entries associated with voicemail may be shown in a view only if they are in a category associated with the particular view. As illustrated in FIG. 5, screen 500 may list entries based on whether the entries are in the category "favorites". The view shown may be identified by the active "Favorites" tab of tabs 510. Those entries associated with a voicemail that has been assigned to the "favorites" category may be listed on screen 500, while those entries that are associated with a voicemail that is not in the "favorites" category may be filtered out and not displayed on screen 500. For example, entries 520 and 530 may display the star icon indicating that they are each associated with a voicemail in the "favorites" category, and therefore are displayed on screen 500. Entries within a single category, such as those shown in screen 500, may be sorted among themselves according to any criteria, such as the time and date of receipt, priority, alphabetically, etc.

Categories may be assigned to voicemail and/or associated entries based on any criteria or combination of criteria. For example, a user may configure a device, such as a voicemail server or a wireless device, to categorize all voicemail from a particular sender in a "favorites" category. Alternatively, a user may configure a device to detect one or more words or phrases in an audible voice portion of a voicemail, or to detect any other characteristic of a voicemail, and, upon detection of the specified word, phrase, or characteristic, assign the voicemail to a particular category. In yet another alternative, a sender may select or specify a characteristic of a voicemail, and a voicemail system or user device may detect the characteristic and automatically assign the voicemail to a particular category based on detecting the characteristic. In yet another alternative, a user may configure a device to determine the distance of the sender from the user, and assign the voicemail to a particular category based on the distance. Note that any categorization scheme may be used and any labels or identifiers may be used to indicate any number of categories, and all such embodiments are contemplated as within the scope of the present disclosure.

In another embodiment, entries associated with voicemail may be shown in a view only if they are in a category associated with the particular view, and the category may also be associated with further actions. As illustrated in FIG. 6, screen 600 may list entries based on whether the entries are in the category "auto-save". The view shown may be identified by the active "Saved" tab of tabs 610. Those entries associated with a voicemail that has been assigned to the "auto-save" category may be listed on screen 600, while those entries that are associated with a voicemail that is not in the "auto-save" category may be filtered out and not displayed on screen 600. For example, entries 620 and 630 may display the checkmark icon indicating that they are each associated with a voicemail in the "auto-save" category, and therefore are displayed on screen 600. Entries within a single category, such as those shown in screen 600, may be sorted among themselves according to any criteria, such as the time and date of receipt, priority, alphabetically, etc.

Individual entries may be associated with a category, priority, or other attribute through user manipulation of the entry. For example, entries shown in screen 200 of FIG. 2 may be selected and moved, for example by dragging, to a category tab such as the "Saved" tab of tabs 610. This may result in the voicemail associated with the selected entry being associated with or assigned certain attributes, such as assigning the selected voicemail a priority or to a category. This action may also cause the user device and/or a voicemail server or system to automatically save the voicemail, or perform other manipulations to the voicemail, visual voicemail entry, or other voicemail related data.

Further actions may be associated with a category such as the "auto-save" category. Voicemails that are assigned to the "auto-save" category may be automatically saved on the voicemail server and/or the user device. Saving such voicemail may be a series of actions, such as moving the voicemail from a user's voicemail inbox to a saved box. Alternatively, saving such voicemail may require simply changing another category or characteristic of the voicemail, for example changing a status characteristic from "new" to "saved". Other actions may be associated with a category, such as automatically forwarding voicemail in a particular category to another phone number or voicemail box, automatically deleting voicemail in a particular category, automatically transcribing voicemail in a particular category to create a text file, automatically emailing such a text file or sending the text via text message, etc. Any other action that may be triggered based on the categorization of a voicemail is contemplated as within the scope of the present disclosure.

Categories may be assigned to voicemail and/or associated entries based on any criteria or combination of criteria. For example, a user may configure a device, such as a voicemail server or a wireless device, to categorize all voicemail from a particular sender in an "auto-save" category. Alternatively, a user may configure a device to detect one or more words or phrases in an audible voice portion of a voicemail, or to detect any other characteristic of a voicemail, and, upon detection of the specified word, phrase, or characteristic, assign the voicemail to a particular category. In yet another alternative, a sender may select or specify a characteristic of a voicemail, and a voicemail system or user device may detect the characteristic and automatically assign the voicemail to a particular category based on detecting the characteristic. In yet another alternative, a user may configure a device to determine the distance of the sender from the user, and assign the voicemail to a particular category based on the distance. Note that any categorization scheme may be used and any labels or identifiers may be used to indicate any number of categories, and all such embodiments are contemplated as within the scope of the present disclosure.

The actions, categorizations, prioritizations, and any other assignment of characteristics or identifiers to a voicemail may be configured by a user. These configurations may be performed before, during, or after a user has listened to an audible voice portion of a voicemail. An example of an interface that allows such configuration is illustrated in FIG. 7. Screen 700 shows a visual voicemail system configuration interface that is associated with a particular visual voicemail entry 710. A user may be presented with a screen such as screen 700 upon selecting an option to configure settings associated with a particular visual voicemail entry. Section 720 presents options for a user associate a priority with particular voicemail sender. The priority may be assigned to all voicemails from the sender, or to only those that both contain certain keywords and originate with the listed sender. The option to specify certain keywords is illustrated in section 740. The option to select whether to assign the selected priority to all voicemail from the listed sender or to only voicemail from the listed sender that contain the keywords is illustrated in section 750. Note that the user may also have the option to create, delete, and/or modify the available priorities shown in section 720.

Section 730 presents options for a user associate a category with particular voicemail sender. The category may be assigned to all voicemails from the sender, or to only those that both contain certain keywords and originate with the listed sender. The option to specify certain keywords is illustrated in section 740. The option to select whether to assign the selected category to all voicemail from the listed sender or to only voicemail from the listed sender that contain the keywords is illustrated in section 750. Note that the user may also have the option to create, delete, and/or modify the available categories shown in section 730, in one embodiment, using a control such as button 735. The user may also have the option to specify actions that are to take place when a voicemail is assigned to a particular category. For example, any voicemail associated with the "auto-save" category listed in section 730 may be automatically saved on a voicemail server and/or user device. Other actions may be associated with categories and may be user-configurable, and all such actions are contemplated as within the scope of the present disclosure.

At section 740, a user may provide one or more words or phrases that are to be detected by a voicemail system. The words provided may be any combination of words, and may be detected in any portion of a voicemail. For example, a voicemail system may transcribe the audible voice message portion of a voicemail and determine if the keywords are present in that portion. Alternatively, a sender may have the option to specify a subject or title for a voicemail, and the subject or title may be examined by a voicemail system to determine if the subject or title includes the keywords. Any other portion or characteristic of a voicemail may be examined for a determination as to whether that portion of characteristic contains one or more keywords or phrases. As shown in section 750, a user may be presented with the option to apply priority, action, or category assignment to all voicemail from a particular sender, or to only voicemail from a particular sender that contains a keyword or phrase. Controls 760 may also be provided to allow the user to save changes made on screen 700 or to cancel and exit from screen 700 without saving the changes made. Any other control may be presented on screen 700 as well.

In one embodiment, a user may be presented with options to assign actions, categorizations, prioritizations, and/or any other assignment of characteristics or identifiers to all received voicemail generally rather than having to configure such setting on a per-sender basis. An example of an interface that allows such configuration is illustrated in FIG. 8. Screen 800 shows a global visual voicemail system configuration interface. A user may be presented with a screen such as screen 800 upon selecting an option to configure settings for a visual voicemail system. At section 810, a user may provide one or more words or phrases that are to be detected by a voicemail system. The words provided may be any combination of words, and may be detected in any portion of a voicemail. For example, a voicemail system may transcribe the audible voice message portion of a voicemail and determine if the keywords are present in that portion. Alternatively, a sender may have the option to specify a subject or title for a voicemail, and the subject or title may be examined by a voicemail system to determine if the subject or title includes the keywords. Any other portion or characteristic of a voicemail may be examined for a determination as to whether that portion of characteristic contains one or more keywords or phrases.

At section 820, a user may have the option to associate a priority with any voicemail in which the specified keywords have been detected. The user may have the option to create, delete, and/or modify the available priorities shown in section 820. Similarly, at section 830, a user may have the option to assign a category and/or an action to any voicemail in which the specified keywords have been detected. The user may have the option to create, delete, and/or modify the available categories and actions shown in section 820, for example by activating control 835*a*. In one embodiment, when any voicemail is determined to contain the specified keyword or phrase entered in section 810, it will be assigned the category, action, and/or priority selected in sections 820 and 830. The assigned categories, actions, and/or priorities may then be used by a visual voicemail system to determine which icons to place on entries for a voicemail, which voicemail to display on certain views and which to filter out of such views, such as the views shown in FIGS. 2-6, the ordering of voicemail presenting in certain views, such as the views shown in FIGS. 2-6, and for any other purpose. All such uses of assigned categories, actions, and priorities are contemplated as within the scope of the present disclosure.

In another embodiment, the distance between a sender and a recipient of a voicemail may be used to assign actions, categorizations, prioritizations, and/or any other assignment of characteristics or identifiers to all received voicemail, or to voicemail from a particular sender. In section 840 of FIG. 8, a user may enter a specific distance to be used in determining whether to assign a priority, action, category, etc. to a voicemail. In section 850, the user may select the priority desired for voicemail that are within the distance specified. The user may have the option to create, delete, and/or modify the available priorities shown in section 850. Similarly, at section 860, a user may have the option to assign a category and/or an action to any voicemail from a sender within the specified distance. The user may have the option to create, delete, and/or modify the available categories and actions shown in section 860, for example by activating control 835*b*.

In alternate embodiments, a user may be able to configure a voicemail system to assign actions, categorizations, prioritizations, and/or any other assignment of characteristics or identifiers to voicemail having any location related characteristic. For example, rather than basing such assignment on whether the sender is closer than a particular distance to a recipient, assignment of voicemail characteristics may be based on whether a sender is farther than a particular distance from a recipient. Alternatively, a span of distance may be used, for example between one and two miles from the recipient. In another alternative, a particular geographical location may be used to determine which characteristics may be assigned. For example, a user may wish to make every voicemail coming from the area of the user's company headquarters a high priority voicemail. Any other distance or location related criteria for assigning actions, categorizations, prioritizations, and/or any other characteristics or identifiers to voicemail are contemplated as within the scope of the present disclosure. Controls 870 may also be provided to allow the user to save changes made on screen 800 or to cancel and exit from screen 800 without saving the changes made. Any other control may be presented on screen 800 as well.

In another embodiment, a user may be able to configure a voicemail system to assign actions, categorizations, prioritizations, and/or any other assignment of characteristics or identifiers to voicemail having a particular sender configured category or attribute. In some embodiments, a voicemail system may allow a sender to select or specify a category or attribute of a voicemail that the sender is composing. Such categories may include general categories such as "personal", "business", "miscellaneous", "sales", "marketing", etc. Alternatively, such categories may be specific to a particular user or user's interest. A voicemail system may be configured such that a user can specify categories that can then be selected by a sender when composing a voicemail for association with the voicemail. Any other configuration of a voicemail system that allows a sender to specify categories is contemplated as within the scope of the present disclosure.

FIG. 9 illustrates a screen 960 that allows a user to configure a voicemail system to assign actions, categorizations, prioritizations, and/or any other assignment of characteristics or identifiers to voicemail having a particular sender configured category or attribute. Section 961 illustrates a particular sender-assignable category. For voicemail that is determined to be associated with this particular sender-assignable category, a user may set a priority at section 962. The user may have the option to create, delete, and/or modify the available priorities shown in section 962. Similarly, at section 963, a user may have the option to assign a category and/or an action to any voicemail from a sender that has specified the category of 961 to be associated with the sender's voicemail. The user may have the option to create, delete, and/or modify the available categories and actions shown in section 963, for example by activating control 964*a*.

Section 965 illustrates another sender-assignable category. For voicemail that is determined to be associated with this particular sender-assignable category, a user may set a priority at section 966. The user may have the option to create, delete, and/or modify the available priorities shown in section 966. Similarly, at section 967, a user may have the option to assign a category and/or an action to any voicemail from a sender that has specified the category of 965 to be associated with the sender's voicemail. The user may have the option to create, delete, and/or modify the available categories and actions shown in section 967, for example by activating control 964*b*. Controls 968 may also be provided to allow the user to save changes made on screen 960 or to cancel and exit from screen 960 without saving the changes made. Any other control may be presented on screen 960 as well.

Figure 10:
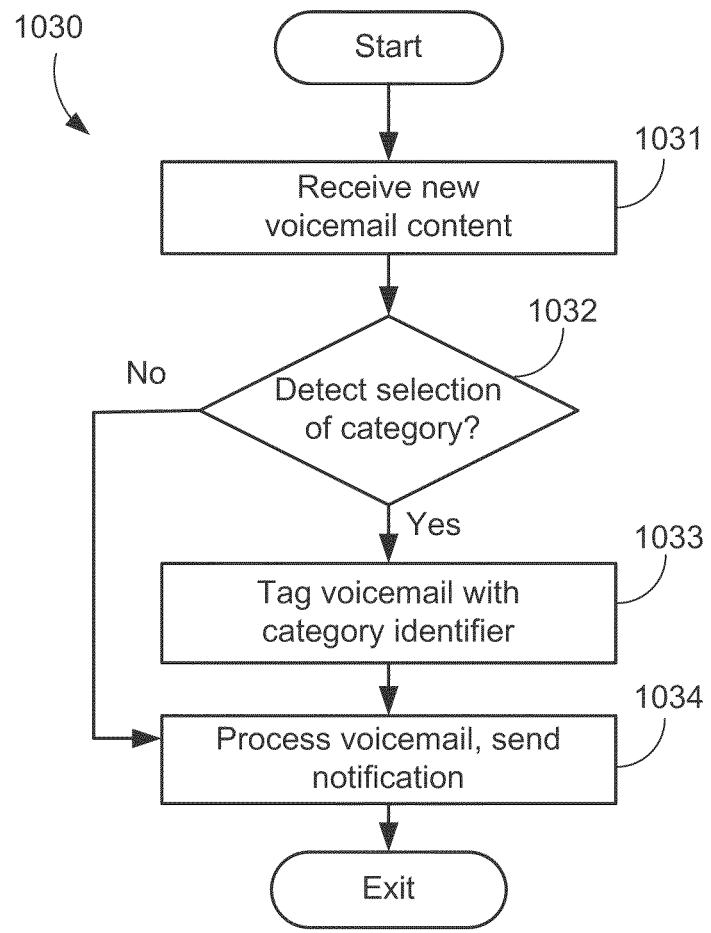
FIG. 10 is a flowchart illustrating a non-limiting, exemplary method of implementing dynamic visual voicemail organization.

FIG. 10 illustrates a non-limiting, exemplary method 1030 of implementing an aspect of the present subject matter, particularly the creation of a voicemail that may be associated with a sender-assignable category. Note that the functions of method 1030 may be performed in any order, and no ordering of said functions is implied by FIG. 10. At block 1031, voicemail content may be received on a voicemail system. This may include the traditional audible voice message portion of a voicemail, as well as other content such as multimedia content, sender location data, time and date data, etc. Such content may be received from a sender or manually or automatically transmitted from a sender device. Any voicemail content and any means of providing, transmitting, and/or receiving such content is contemplated as within the scope of the present disclosure.

At block 1032, a determination is made as to whether the sender has selected a category to be associated with the voicemail. This determination may be made following the presentation of an interface of any type that requests a category specification from the sender. The interface presented may be an audio interface or a visual interface. The interface may allow a sender to select from general categories such as "personal", "business", "miscellaneous", "sales", "marketing", or from categories specific to a particular user or user's interest. A voicemail system may be configured such that a user can specify categories that can then be selected by a sender when composing a voicemail for association with the voicemail. Any other configuration of a voicemail system that allows a sender to specify categories is contemplated as within the scope of the present disclosure. If the sender elects not to assign a category to the sender's voicemail, then at block 1034, the voicemail is processed and any other actions needed may be performed. At block 1034, the voicemail system may also send a notification to the intended recipient.

If at block 1032 it is determined that the sender has selected a category for the voicemail, at block 1033 an identifier is associated with the voicemail that indicates the categorization of the voicemail. The identifier may be any form of identifier, including a field attached to a voicemail or a voicemail notification. The identifier may be transmitted with a voicemail or a voicemail notification to a user device or a visual voicemail system, and may be used by that device or system to determine further categorization, prioritization, actions, methods of displaying the voicemail or an entry associated with the voicemail, etc.

At block 1033 the voicemail is processed and any other actions needed may be performed. At block 1034, the voicemail system may also send a notification to the intended recipient, and such a notification may include the category identifier.

Figure 11:
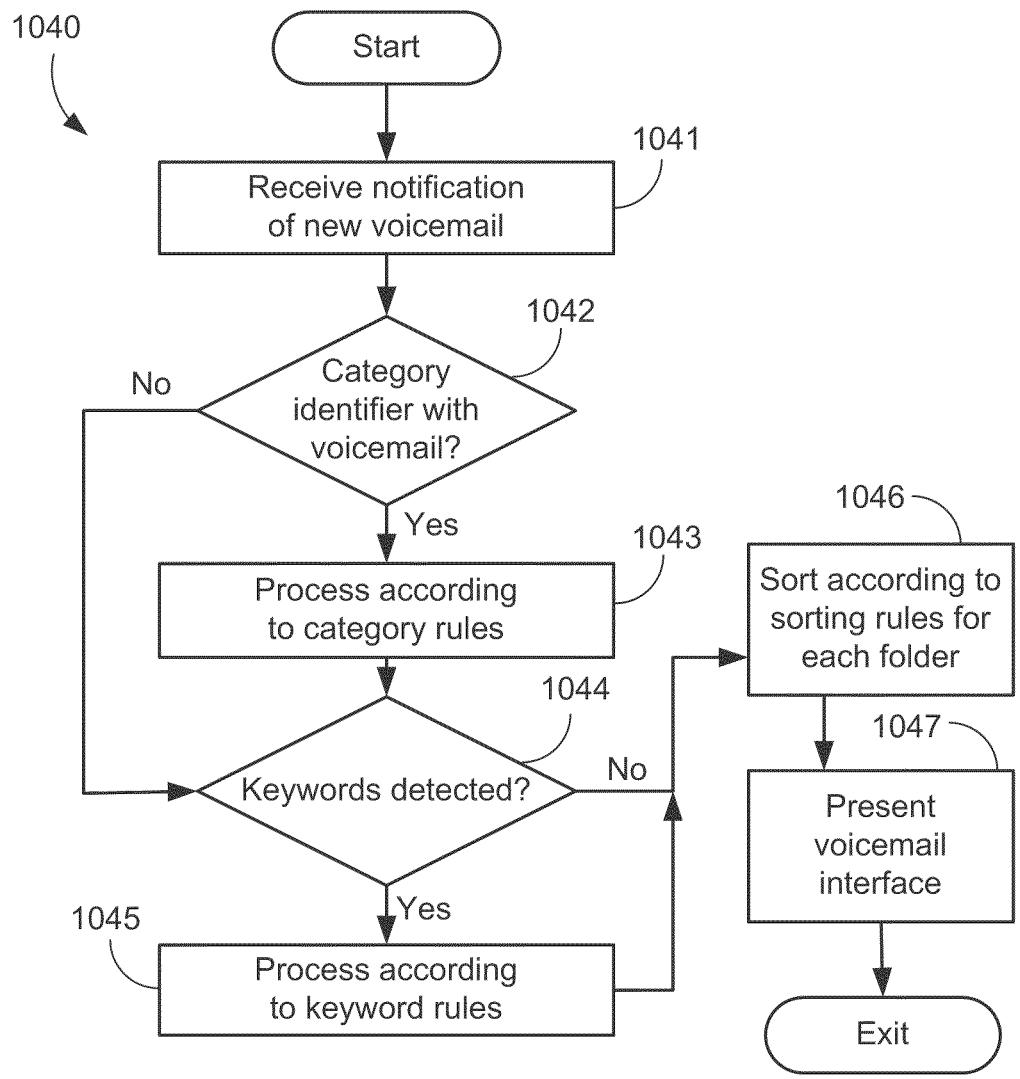
FIG. 11 is a flowchart illustrating a non-limiting, exemplary method of implementing dynamic visual voicemail organization.

FIG. 11 illustrates a non-limiting, exemplary method 1040 of implementing an aspect of the present subject matter, particularly the presentation of visual voicemail entries associated with a user's voicemail. Note that the functions of method 1040 may be performed in any order, and no ordering of said functions is implied by FIG. 11. At block 1041, a notification of an available voicemail may be received on a user device or a voicemail system. The notification may include other data relating to the voicemail, including sender location data, time and date data, sender categorization data, etc. In some embodiments, a voicemail system may perform the processing described herein in regard to assigning actions, categorizations, prioritizations, and/or any other assignment of characteristics or identifiers to voicemail having particular attributes. In such embodiments, data may be transmitted with the notification that allows a user device to present the visual voicemail interface to a user. Alternatively, a notification may merely be a notice of an available voicemail with the relevant voicemail data, and all the processing described herein in regard to assigning actions, categorizations, prioritizations, and/or any other assignment of characteristics or identifiers to voicemail may be performed by a user device. Alternatively, some or all such processing may be performed by a user device working in conjunction with a voicemail system. Any alternate configurations are contemplated.

At block 1042, it is determined whether there is a category identifier associated with the voicemail. This may be a category identifier associated with the voicemail due to sender selection of a category, or any other category identifier. If there is no category identifier, then method 1040 proceeds to block 1044. If there is a category identifier, then at block 1043 processing is performed in accordance with any configured category rules. This may include assigning a voicemail or its associated entry to a particular folder, tab, or other software container, presenting or automatically configuring a voicemail system or user device to present an entry associated with the voicemail in a particular order in certain views, present the entry with a particular icon, present the entry with a particular formatting or coloring, and/or determining whether to present the entry or filter the entry in certain views generated by a visual voicemail system. Examples of such views are shown in FIGS. 2-6.

At block 1044, a determination may be made as to whether there are any keywords detected in the voicemail. Such determination may evaluate the audible voice message portion of a voicemail, or any other portion of a voicemail to determine whether a keyword or phrase is present. As mentioned above, a visual voicemail system may be configured to categorize, prioritize, or otherwise take certain actions based on whether some portion of a voicemail contains certain keywords or has other attributes or characteristics. In one embodiment, determining whether a voicemail includes a keyword or phrase may be performed on a voicemail server or system, and an indicator of the presence of the keyword or phrase may be sent with the notification received at block 1041. Alternatively, a voicemail server or system may transmit a transcribed version of the voicemail with the notification to a user device, and the determination as to whether the voicemail includes a keyword or phrase may be performed on the user device. In another alternative, the voicemail server or system may transmit the notification with the audible voice message portion intact, for example as an audio file, and the user device may evaluate, transcribe, or otherwise take actions that allow the user device to determine whether the voicemail includes a keyword or phrase. Any other configuration or means of determining whether the voicemail includes a keyword or phrase may be used, and all such embodiments are contemplated as within the scope of the present disclosure.

If no keywords are detected, method 1040 progresses to block 1046. If such keywords or characteristics are detected, at block 1045, processing is performed in accordance with any configured keyword detection rules. This may include associating a voicemail with a particular priority, action, and/or category, which may then trigger presenting or automatically configuring a voicemail system or user device to take the specified action, assigning a voicemail or its associated entry to a particular folder, tab, or other software container, present an entry associated with the voicemail in a particular order in certain views, present the entry with a particular icon, present the entry with particular formatting or coloring, and/or determining whether to present the entry or filter the entry in certain views generated by a visual voicemail system. Examples of such views are shown in FIGS. 2-6.

At block 1046, lists of entries associated with voicemails may be sorted according to the rules of the folders in which such entries may be presented and/or stored. Folders in this embodiment may be equivalent to the tabs of FIGS. 2-6. Entries for each voicemail may be associated with one or more folders according to categorization, prioritization, location, or other voicemail attributes. Note that such sorting may take the form of maintaining lists of entries for each folder where there may be duplicate entries across folders, or maintaining lists of references to a single entry per voicemail. Alternatively, lists of entries may not be sorted or even created until needed, for example when a user interacts with a visual voicemail system to request a view that includes a list of entries for which sorting is needed. Any variation on the sorting process and timing may be used, and all such embodiments are contemplated as within the scope of the present disclosure.

At block 1047, a visual voicemail interface may be presented to a user. This may be the result of user interaction requesting the interface, or it may be automatically triggered, for example by the detection of the notification of an available voicemail as received at block 1041. Any type of visual voicemail interface may be presented, and any voicemail system the embodies the subject matter disclosed herein is contemplated as within the scope of the present disclosure.

Figure 12:
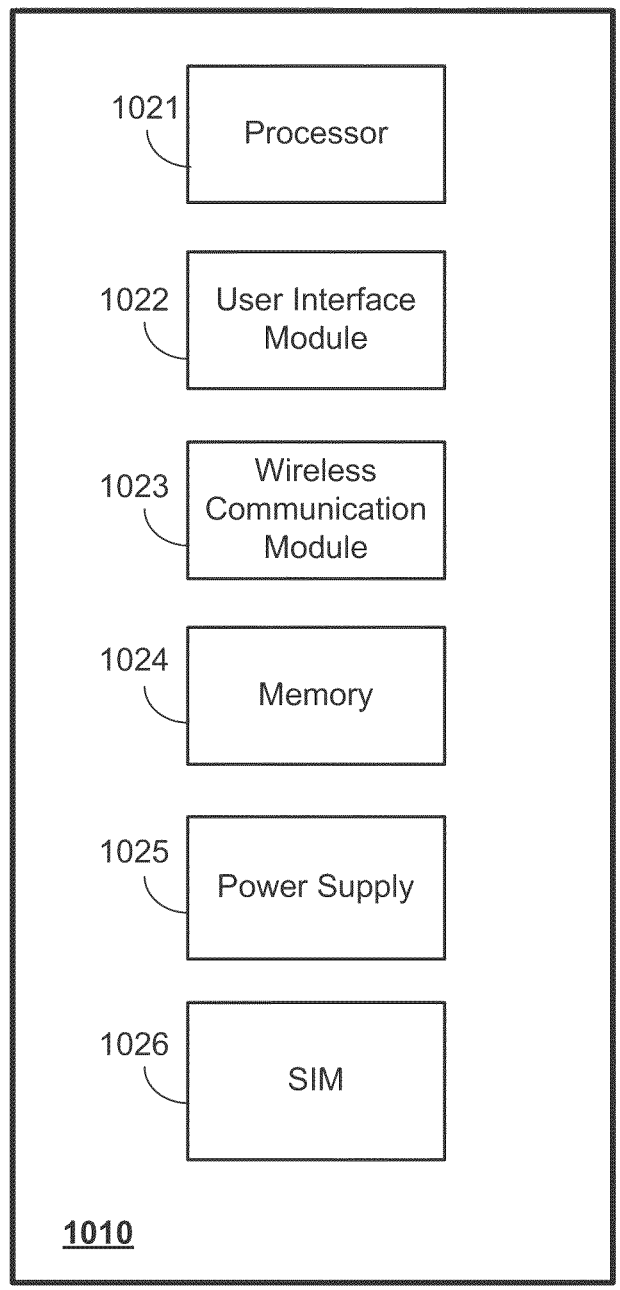
FIG. 12 is a block diagram of a non-limiting, exemplary wireless device that may be used in connection with dynamically organizing visual voicemail.

FIG. 12 illustrates an example wireless device 1010 that may be used in connection with an embodiment. References will also be made to other figures of the present disclosure as appropriate. For example, wireless devices 111 and 121 may each be a wireless device of the type described in regard to FIG. 12, and may have some, all, or none of the components and modules described in regard to FIG. 12. It will be appreciated that the components and modules of wireless device 1010 illustrated in FIG. 12 are illustrative, and that any number and type of components and/or modules may be present in wireless device 1010. In addition, the functions performed by any or all of the components and modules illustrated in FIG. 12 may be performed by any number of physical components. Thus, it is possible that in some embodiments the functionality of more than one component and/or module illustrated in FIG. 12 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to dynamically organizing visual voicemail, for example. User interface module 1022 may be any type or combination of hardware and/or software that enables a user to operate and interact with wireless device 1010, and, in one embodiment, to interact with a system or software enabling the user to place, request, and/or receive calls, voicemail, voicemail notifications, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 101, or any other type of wireless communications network or network equipment. Memory 1024 enables wireless device 1010 to store information, such as voicemail notifications, visual voicemail software, multimedia content, software to interact with voicemail systems, and voicemail preferences. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 13:
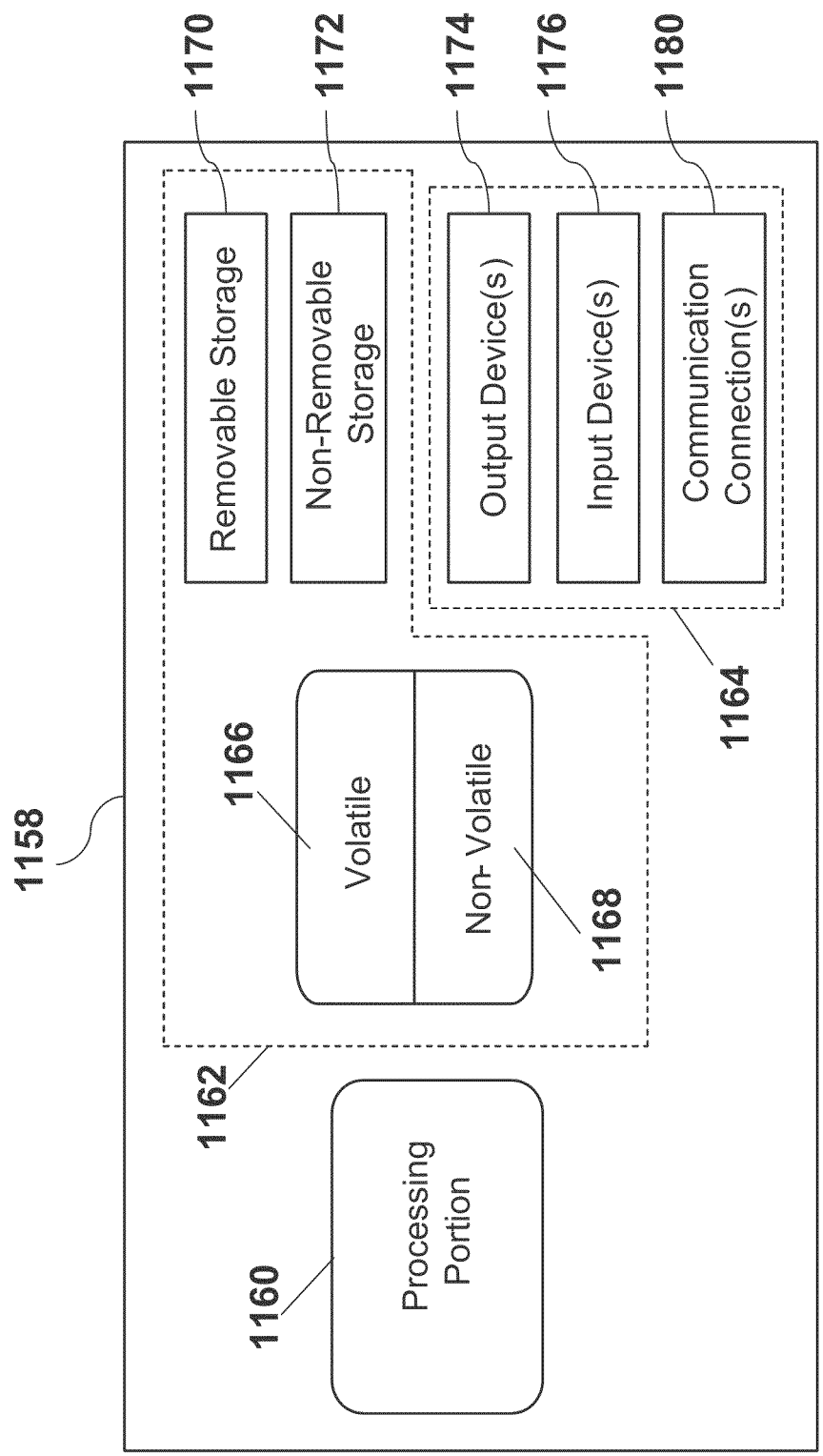
FIG. 13 is a block diagram of a non-limiting, exemplary processor in which dynamic visual voicemail organization may be implemented.

FIG. 13 is a block diagram of an example processor 1158 which may be employed in any of the embodiments described herein, including as one or more components of wireless devices 111 and 121, as one or more components of network equipment or related equipment, such as any component shown in FIG. 1, and/or as one or more components of any third party system or subsystem that may implement any portion of the subject matter described herein. It is emphasized that the block diagram depicted in FIG. 13 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 13, the processor 1158 comprises a processing portion 1160, a memory portion 1162, and an input/output portion 1164. The processing portion 1160, memory portion 1162, and input/output portion 1164 are coupled together (coupling not shown in FIG. 9) to allow communications between these portions. The input/output portion 1164 is capable of providing and/or receiving components, commands, and/or instructions, utilized to, for example, dynamically organize visual voicemail, transmit and receive voicemail notifications, transmit, receive, store and process voicemail content, execute software to interact with voicemail systems, receive and store voicemail preferences, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing voicemail, calls, other telephonic communications, etc. For example, the memory portion is capable of storing voicemail preferences and/or software capable of processing call requests, receiving calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how integration of multimedia content with voicemail may be implemented with stationary and non-stationary network structures and architectures in order to provide integration of multimedia content with voicemail. It can be appreciated, however, that methods and systems for dynamically organizing visual voicemail such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for dynamically organizing visual voicemail can be applied independently of the method of data transport, and do not depend on any particular network architecture, or underlying protocols.

Figure 14:
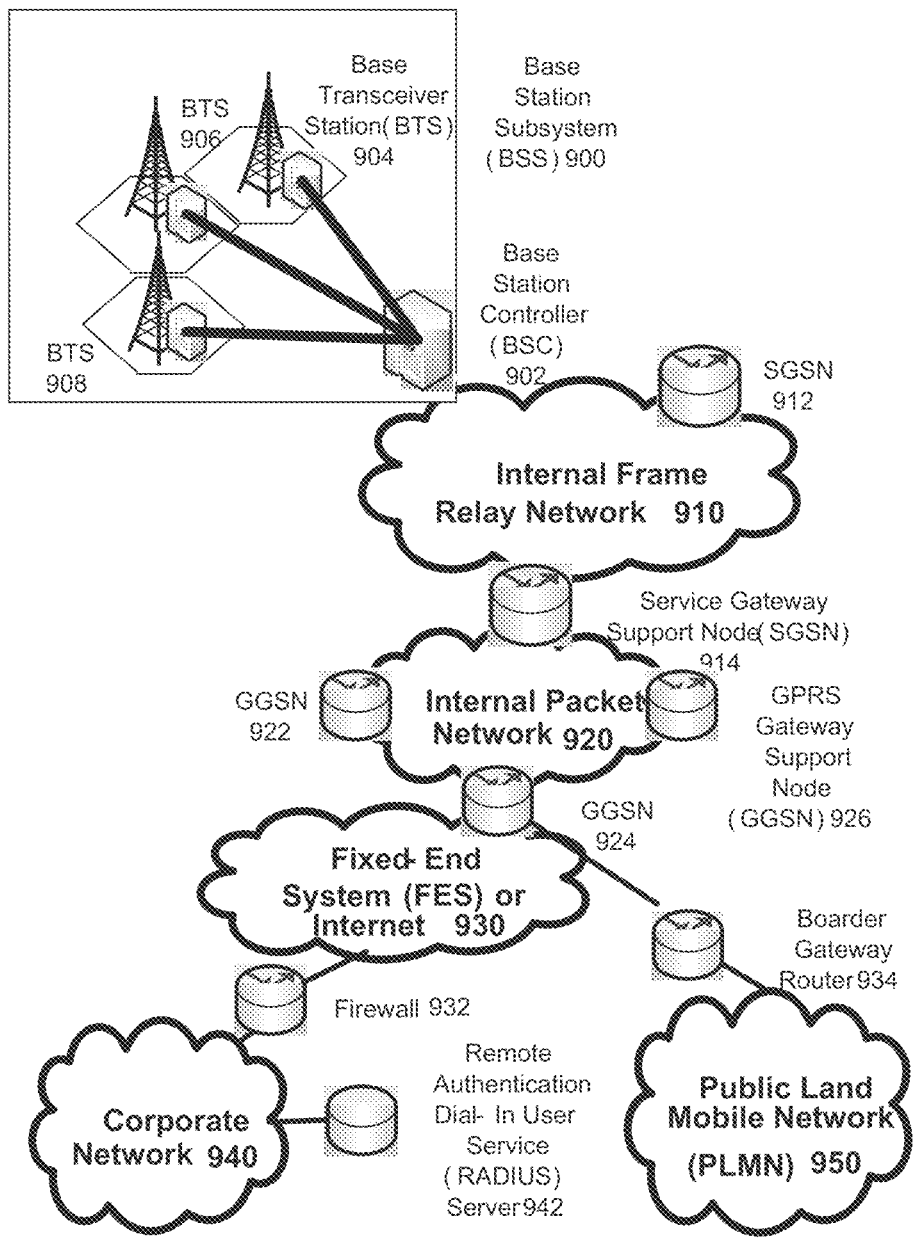
FIG. 14 is a block diagram of an exemplary packet-based mobile cellular network environment, such as a GPRS network, in which dynamic visual voicemail organization may be implemented.

FIG. 14 depicts an overall block diagram of an exemplary packet-based mobile cellular network environment, such as a GPRS network, in which the systems and methods for dynamically organizing visual voicemail such as those described herein can be practiced. In an example configuration, network 101 as illustrated in FIG. 1 may be encompassed by or interact with the network environment depicted in FIG. 14. Similarly, wireless devices 111 and 121 may communicate or interact with a network environment such as that depicted in FIG. 14. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111 and 121) become connected to the wireless network. In exemplary fashion, the packet traffic originating from user devices (e.g., wireless devices 111 and 121) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934.

The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 15:
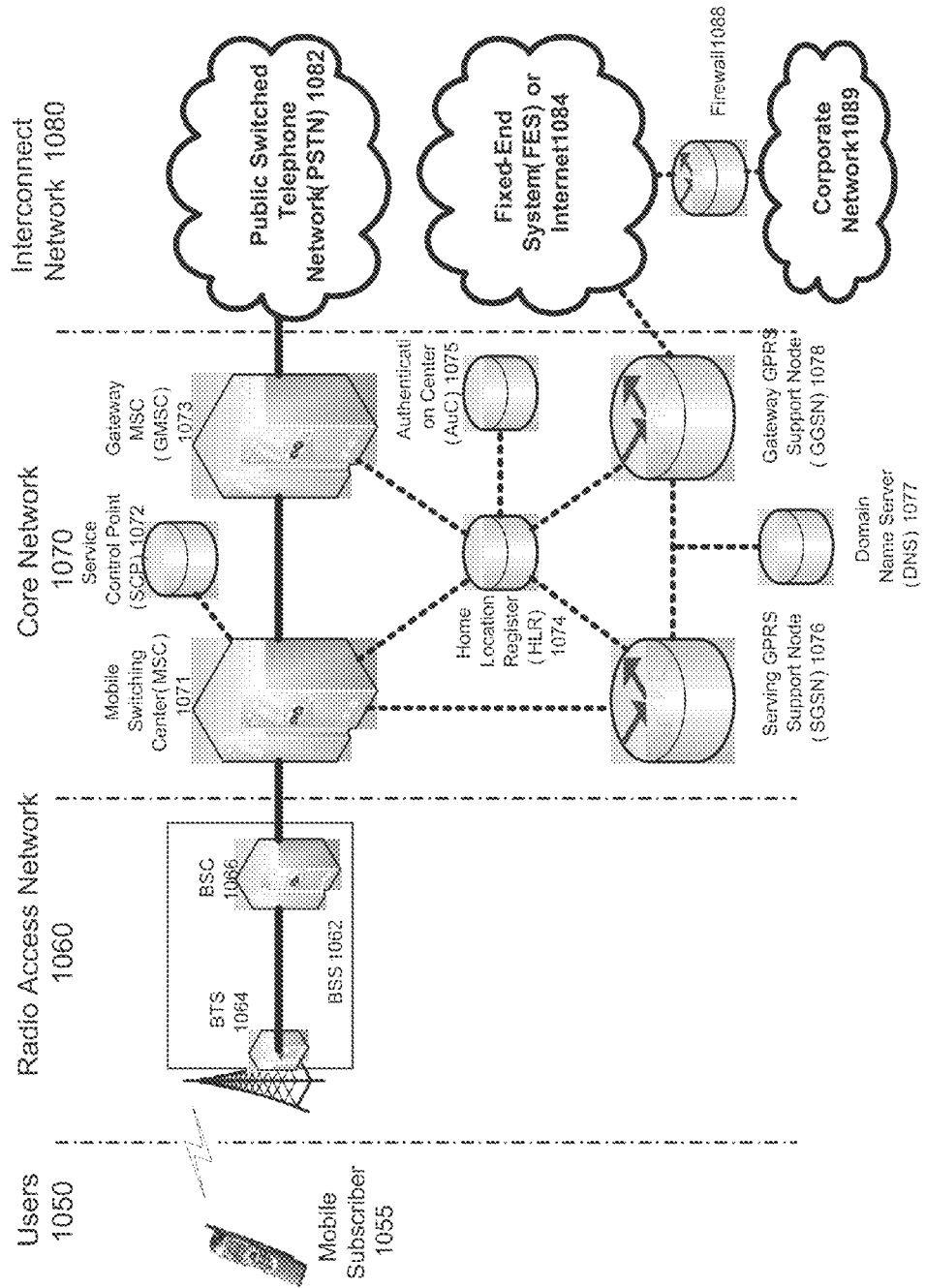
FIG. 15 illustrates a non-limiting, exemplary architecture of a typical GPRS network, segmented into four groups, in which dynamic visual voicemail organization may be implemented.

FIG. 15 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 15). In an example embodiment, the device depicted as mobile subscriber 1055 may comprise wireless devices 111 and 121. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 15, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111 or 121, used by an end user of a mobile cellular service or a wireless provider. When a mobile subscriber turns on his or her mobile device, the mobile device may go through an attach process by which the mobile device attaches to an SGSN of the GPRS network. In FIG. 15, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of dynamically organizing visual voicemail such as those described herein can include but are not limited to Gateway GPRS Support Node tables, Fixed End System router tables, firewall systems, VPN tunnels, and any number of other network elements as required by the particular digital network.

Figure 16:
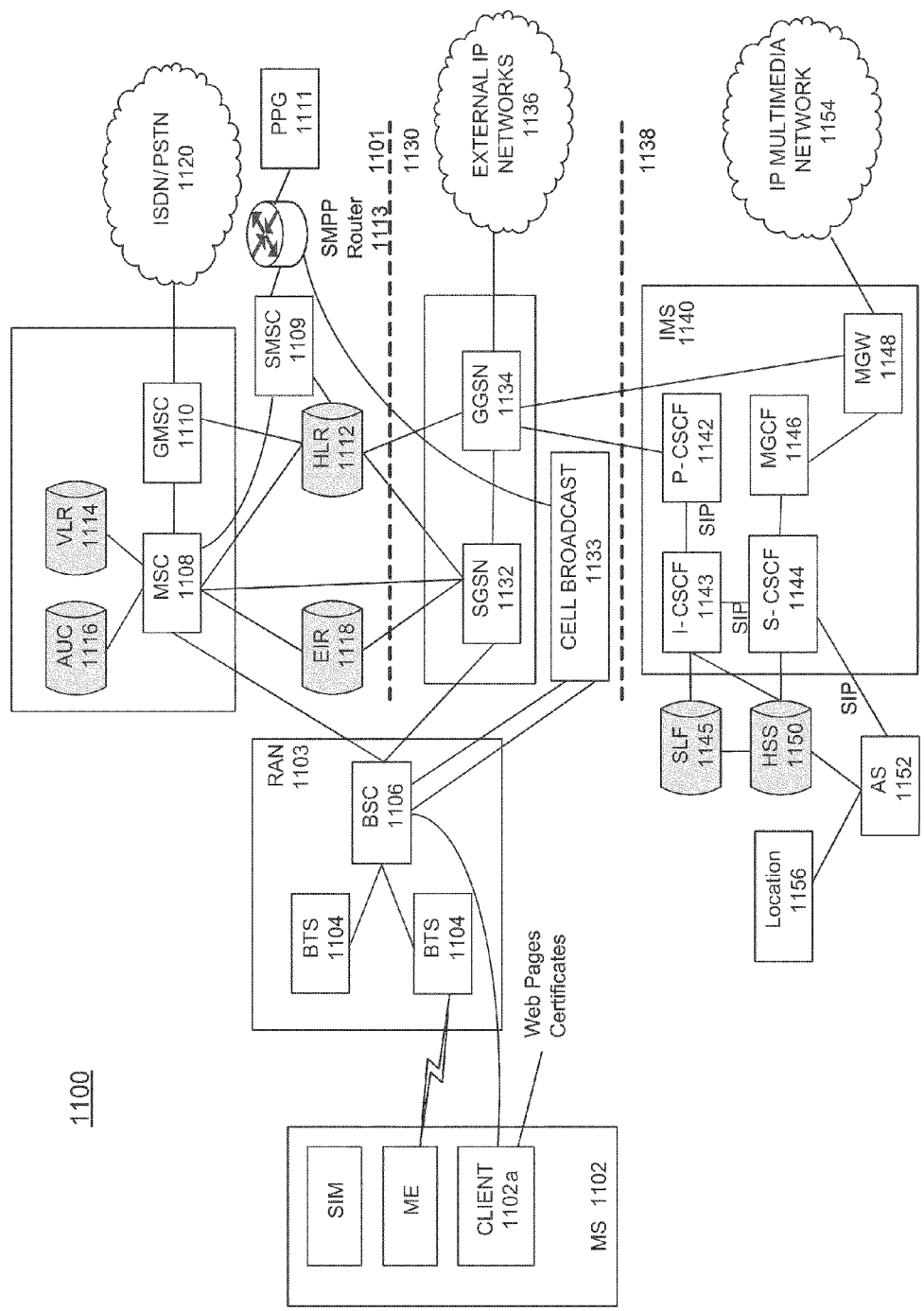
FIG. 16 illustrates a non-limiting alternate block diagram of an exemplary GSM/GPRS/IP multimedia network architecture in which dynamic visual voicemail organization may be implemented.

FIG. 16 illustrates another exemplary block diagram view of a GSM/GPRS/IP multimedia network architecture 1100 in which the systems and methods for dynamically organizing visual voicemail such as those described herein can be incorporated. As illustrated, architecture 1100 of FIG. 16 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111 and 121) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for dynamically organizing visual voicemail have been described in connection with various communications devices and computing devices/processors, the underlying concepts can be applied to any communications or computing device, processor, or system capable of implementing the visual voicemail systems and methods described. The various techniques described herein can be implemented in connection with hardware or software or, where appropriate, with a combination of both. Thus, the methods and apparatuses for dynamically organizing visual voicemail, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for dynamically organizing visual voicemail. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for dynamically organizing visual voicemail can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for dynamically organizing visual voicemail. When implemented on a general-purpose processor, the program code combines with the processor to provide a unique apparatus that operates to invoke the functionality of a visual voicemail system as described herein. Additionally, any storage techniques used in connection with a visual voicemail system can invariably be a combination of hardware and software.

While dynamically organizing visual voicemail has been described in connection with the various embodiments of the various figures, it is to be understood that other similar embodiments can be used or modifications and additions can be made to the described embodiment for performing the same function of dynamically organizing visual voicemail without deviating therefrom. For example, one skilled in the art will recognize that dynamically organizing visual voicemail as described in the present application may apply to any environment, whether wired or wireless, and may be applied to any number of such devices connected via a communications network and interacting across the network. Therefore, dynamically organizing visual voicemail should not be limited to any single embodiment, but rather should be construed in breadth and scope in accordance with the appended claims.

What is claimed is:

1. A wireless communications device comprising:
   a processor; and a memory coupled with the processor, the memory comprising executable instructions that when executed by the processor cause the processor to effectuate operations comprising:
receiving a notification of an available voicemail comprising a location of a sender of the voicemail;
determining a distance between a current location of the wireless communications device and the location of the sender of the voicemail is less than a predetermined distance;
in response to determining that the distance is less than the predetermined distance, generate a visual voicemail entry comprising an icon indicating that the distance is less than the predetermined distance;
determine a first position of the visual voicemail entry among a plurality of visual voicemail entries based on the distance;
determining a priority associated with the voicemail;
assigning the priority to the voicemail based on the distance;
determining the first position of the visual voicemail entry among the plurality of visual voicemail entries based on the priority associated with the voicemail;
generating a list comprising the visual voicemail entry and the plurality of visual voicemail entries sorted by priority;
assigning a category to the voicemail based on detection of the distance and a keyword in an audible voice portion of the voicemail; and
based on the category:
transcribing the voicemail in the category to create a text file comprising text of the audible voice portion, and
automatically sending an email or a text message of the text file.

2. The wireless communications device of claim 1, further operations comprising determining whether the available voicemail comprises the keyword.

3. The wireless communications device of claim 2, further operations comprising detecting an indicator of the keyword based on the notification.

4. The wireless communications device of claim 2, further operations comprising evaluating the transcribed portion of the available voicemail to determine whether the keyword is present in the transcribed portion.

5. The wireless communications device of claim 1, further operations comprising based on the category, forwarding voicemail in a particular category to another phone number or voicemail box.

6. The wireless communications device of claim 1, further operations comprising generating a visual indicator of the priority associated with the voicemail.

7. The wireless communications device of claim 1, further operations comprising based on the category deleting voicemail.

8. The wireless communications device of claim 7, further operations comprising generating a visual indicator of the category associated with the voicemail.

9. The wireless communications device of claim 1, further operations comprising:
further determining the first position of the visual voicemail entry among the plurality of visual voicemail entries based on the category associated with the voicemail; and
generating a list comprising the visual voicemail entry and a subset of the plurality of visual voicemail entries, wherein the subset of the plurality of visual voicemail entries is associated with the category associated with the voicemail.

* * * * *